United States Patent [19]

Fujita et al.

[11] Patent Number: 4,609,680

[45] Date of Patent: Sep. 2, 1986

[54] PROCESS FOR THE DEPOLYMERIZATION OF POLYESTER SCRAP

[75] Inventors: Akiharu Fujita, Atami; Minako Sato, Shizuoka; Masashige Murakami, Mishima, all of Japan

[73] Assignee: Toray Industries, Inc., Tokyo, Japan

[21] Appl. No.: 735,837

[22] Filed: May 20, 1985

[30] Foreign Application Priority Data

May 25, 1984 [JP] Japan .................... 59-104482

[51] Int. Cl.$^4$ .................... C08J 11/24; C08L 67/02
[52] U.S. Cl. .................... 521/48; 521/40
[58] Field of Search .................... 521/48, 40

[56] References Cited

U.S. PATENT DOCUMENTS

| 3,305,495 | 2/1967 | Vom Orde | 521/48 |
| 3,565,852 | 2/1971 | Conix et al. | 521/48 |
| 4,439,549 | 3/1984 | Brennan | 521/48 |
| 4,485,196 | 11/1984 | Sieranza et al. | 521/48 |

FOREIGN PATENT DOCUMENTS 48-61447  8/1973  Japan .
610136   10/1948  United Kingdom .
1064415   4/1967  United Kingdom .................... 521/48

Primary Examiner—Allan M. Lieberman
Attorney, Agent, or Firm—Austin R. Miller

[57] ABSTRACT

Polyethylene terephthalate scrap is depolymerized to bis-hydroxyethyl terephthalate and/or its oligomer (BHT) by supplying the scrap, together with ethylene glycol, to a reactor containing molten BHT under the following conditions (a) the molten BHT has a glycol to acid component equivalent ratio of 1.3 to 2.0
(b) the ratio by weight of the acid component of the molten BHT to that of the polyester scrap is 1/4 to 2/1
(c) the ratio of polyester scrap to ethylene glycol is such as to have a glycol to acid component equivalent ratio between the limits of 1.3 to 2.0.

The depolymerization is performed at 215° to 250° C. with agitation of the reactants, after which a part of the product in the reactor be removed to a polymerizing reactor.

5 Claims, 1 Drawing Figure

PROCESS FOR THE DEPOLYMERIZATION OF POLYESTER SCRAP

FIELD OF THE INVENTION

This invention relates to the process for depolymerizing polyester scrap whose main component is polyethylene terephthalate (referred to as PET hereinafter), and for recovering high-quality bis-hydroxyethyl terephthalate and/or its oligomer (referred to as BHT hereinafter).

DESCRIPTION OF THE PRIOR ART

Polyester, for example PET, is extensively produced in the form of fibers, films, plastics and so forth because of the excellent properties of this material. The effective utilization of the fiber, film and resin scraps which are produced in their manufacturing process is very significant for saving industrial cost. Hitherto, the Specification of the British Pat. No. 610,136 and the Official Gazette of Japanese unexamined patent publication No. 61447/1973 propose processes for obtaining BHT through the depolymerization of polyester scraps by using ethylene glycol (referred to as EG hereinafter) and for obtaining reconstituted polyester by directly polymerizing the BHT, thus obtained. If the whole of the polyester scrap is supplied at once, together with all the EG as in the above processes, difficulties are encountered, in as much as the depolymerization reaction system cannot be agitated because of solidification of the components in the system. This causes the following defects: the system of depolymerization cannot be made homogeneous, thus prolonging the depolymerization time, the use of EG in great quantities provides economic disadvantages, and the obtained polyester is reduced in quality through the degrading of its physical properties, particularly the considerable lowering of its softening point, by subproduced diethylene glycol (referred to as DEG hereinafter). Such conventional processes have not succeeded in obtaining high-quality repolymerization polyesters by effectively depolymerizing polyester scrap as yet.

OBJECT OF THE INVENTION

The object of this invention is (a) to recover BHT which is usable to provide a high-quality repolymerized polyester and (b) to reduce consumption of EG in order to minimize the subproduction of DEG and other impurities at the step of depolymerization and to shorten the depolymerization time.

DETAILED DESCRIPTION OF THE PREFERRED EMBODIMENTS

Figure 1:
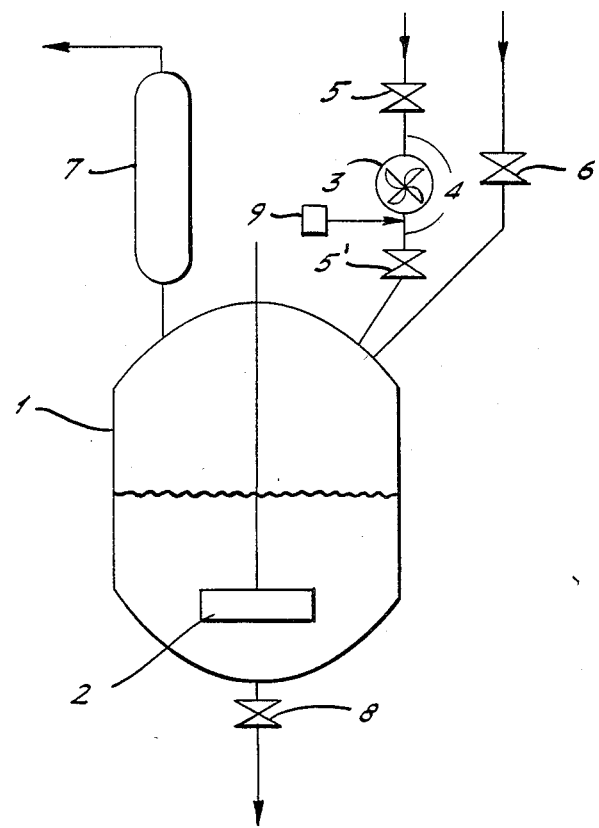

According to the invention there is provided a process for depolymerizing polyester scrap whose main component is ethylene terephthalate, comprising the steps of (1) supplying both ethylene glycol and polyester scrap either in intermittent batches over a period of time, or continuously over a period of time to a reactor in the presence of molten BHT under the following conditions:

(a) the molten BHT is to have a glycol to acid component equivalent ratio of 1.3 to 2.0

(b) the ratio by weight of the acid component of the molten BHT to that of the polyester scrap is to be 1/4 to 2/1

(c) the ratio of polyester scrap to EG is such as to give a glycol to acid component equivalent ratio between the limits of 1.3 to 2.0

(2) depolymerizing under agitation between the temperatures of 215° and 250° C.

In this invention, part of the depolymerized material from the said reactor may be removed to a polymerizing reactor, the remainder being left in the depolymerizing reactor for a subsequent polyester scrap depolymerization process.

The polyester scrap for use in the process of this invention may be of film, lump, fiber, chip or pellet form, provided the particles can be continuously supplied to a depolymerizing reactor. However it is desirable to use particles of about 1 g weight or less in order to avoid sedimentation while being agitated, even if they are continuously added to the BHT. The polyester scrap to be used may consist wholly of PET composed of terephthalic acid or its lower alkylesters and EG. However, the polyethylene terephthalate used may also have part of the acid and/or glycol component replaced by one or more of isophthalic acid, phthalic acid, diphenylcarboxylic acid, succinic acid, adipic acid, sebacic acid, p-hydroxybenzoic acid and other bi-functional acids; or diol compounds such as trimethylene glycol, tetramethylene glycol, hexamethylene glycol and polyethylene glycol. They may also contain pigments or other usual additives, such as those imparting heat resistance.

A rotary feeder may desirably be used to supply polyester scrap because of its dosing performance and stability. In such case, there is a tendency for the EG vapor generated in the reaction system to humidify the inside of the polyester scrap supplier in use and for the scrap to attach thereto. We therefore prefer to install equipment for blowing nitrogen gas between the scrap supplier and the depolymerizing reactor in use. Further we prefer to install a valve to control the supply of nitrogen gas between the scrap supplier and depolymerizing reactor.

The BHT present in the depolymerizing reactor may be BHT synthesized from aromatic dicarboxylic acid and glycol or dimethyl terephthalate and glycol by known processes, and/or the oligomer produced by a known depolymerizing process and/or the BHT obtained by the process according to this invention.

The BHT present in the depolymerizing reactor is required to have the acid component ratio by weight to supplied polyester scrap of 1/4 to 2/1, preferably 1/3 to 1/1, to obtain high-quality BHT. If the ratio is less than 1/4, depolymerization slows down, thus requiring a long time until its completion. If it is more than 2/1, on the other hand, the comparatively large proportion of BHT maintained at high temperatures for a long time may cause subreaction, so the polyester obtained therefrom become worse in color with lower softening point.

The supply rate of EG is such as to provide an equivalent ratio of glycol to the acid component of the polyester scrap of 1.3 to 2.0, preferably of 1.3 to 1.6, to efficiently obtain high-quality BHT. If it is less than 1.3, the BHT obtained through depolymerization is degraded in quality, and as a result, the obtained polymer becomes worse in color (b-value).

If it is more than 2.0, EG consumption increases and economy is affected, DEG is produced through sub-reaction, thus lowering the softening point of the polyester obtained from this BHT and boiling point of the reaction system is lowered, thus causing a prolongation of the depolymerization time.

The depolymerization system is to be kept at the temperature of 215° to 250° C., preferably 220° to 240° C. If it is below 215° C., polyester scrap is not readily dissolved. If it is above 250° C., on the other hand, DEG sub-production increases, thus lowering the softening point of obtained polyester.

Ordinary ester-interchanging and esterifying reactors are available as the depolymerizing reactor. The small content of the moisture in polyester scrap is liable to accumulate in the reaction system in the course of depolymerization and this depresses the temperature of the reaction system, so the reaction time becomes longer and the BHT obtained therethrough degrades in quality. It is desirable to distill the moisture off outside the reaction system by using a rectifying tower in the depolymerizing reactor for preventing its accumulation. The rectifying tower can be of known type that is capable of separating EG and moisture. EG and polyester scrap are supplied simultaneously in a fixed time so that they have almost same glycol to acid component equivalent ratio as the initial BHT. This supply may be performed either continuously or intermittently both or continuously for either one of them and intermittently for the other. In case of intermittent supply, it is desirable to divide and supply the total quantity of scrap in five or more batches. The supply rate may either be kept constant or increased slowly.

The supply rate of scrap for depolymerization considerably influences the quality of BHT. If the rate is too large, polyester scrap cannot be agitated because of its solidification in the reaction system, thereby increasing depolymerization time and the polymer obtained by polymerizing BHT has a lower softening point and becomes worse in color. On the contrary if the rate is too small, the depolymerization time is also increased, and the quality of the obtained polyester is deteriorated.

The time of supplying polyester scrap, although influenced by the quantity thereof and of the BHT present in the reactor, can preferably be 60 to 90 minutes or 30 to 60 minutes when the ratio by weight of the acid component of the BHT to that of the polyester scrap is 1/4 to 3/4 or 3/4 to 2/1 respectively.

The accompanying drawing illustrates an example of an apparatus suitable for the process of this invention, and this will now be described in greater detail.

Polyester scrap is continuously supplied to a depolymerizing reactor 1 from a scrap supplier 3 through a pipe 4. The reactor 1 contains BHT having the glycol to acid component equivalent ratio of 1.3 to 2.0, with the acid component ratio by weight of BHT to that of the polyester scrap to be supplied being fixed at 1/4 to 2/1.

A rectifying tower 7 is attached to the depolymerizing reactor 1 to distill off moisture outside the system of depolymerization. Hitherto-known methods are available for supplying scrap to the depolymerizing reactor 1. During the supply, however, the EG vapor being generated by the reaction system is liable to humidify the inside of the scrap supplier 3 whereby scrap attaches thereto and make the supply rate of the scrap inconstant. Therefore an equipment is preferably provided between the lower part of the scrap supplier 3 and the depolymerizing reactor 1 for blowing nitrogen gas and sealing the scrap supplier by nitrogen gas. A rotary feeder can desirably be used for supplying the scrap from the viewpoints of its accurate performance and stability for supply of the desired weight. Further a valve 5, particularly a gate valve is desirably provided before the feeder, and a valve 5', particularly a no-slide valve, is desirably provided between the feeder and the depolymerizing reactor. The supply of scrap is continuously performed by driving the scrap supplier 3 with the valves 5 and 5' open and blowing nitrogen gas continuously by blowing equipment 9. The supply rate of nitrogen gas is preferably 1 to 50 l/min., more preferably 3 to 30 l/min., when 1 to 5 tons of BHT is obtained through depolymerization. After supplying polyester scrap, valves 5 and 5' are closed whilst the scrap supplier 3 is kept sealed by nitrogen gas.

At the same time as the supply of polyester scrap, EG is supplied in a continuous stream with valve 6 open, until the requisite quantity has been supplied. During this introduction of the reactants and the subsequent depolymerization, the contents of the reactor are agitated. Depolymerization is performed with the temperature of the inside of the reaction system and the glycol to acid component equivalent ratio of the depolymerizing reactor 1 being kept at 215° to 250° C. and 1.3 to 2.0 respectively.

The BHT obtained through depolymerization is partly supplied to a polymerizing reactor through a transfer valve 8 for repolymerization. In conventional depolymerization processes, EG and polyester scrap are heated after being supplied all together. Therefore, they cannot be agitated because of the solidification which occurs, and the inhomogeneous reaction system increases depolymerization time and makes said time inconstant.

The process according to this invention permits the agitation of the contents of a depolymerization reactor 1 by agitating blades 2, thus rendering the depolymerization time more constant.

This invention produces the following effects not obtainable from conventional process;

A. The depolymerization time is shortened.

B. Economical advantage is obtained because of the decrease of the EG consumption for depolymerization.

C. The polyester obtained by repolymerizing the BHT of this invention has high softening point, good color, small content of foreign substances and qualities comparable to ordinary polyester.

EXAMPLE 1

The quantity 2,142 parts of BHT having an EG to terephthalic acid equivalent ratio of 1.5 was introduced into a depolymerizing reactor having a rectifier, a agitator and a heater such as shown in FIG. 1 and was melted by heating to a temperature of 220° C. Next 1,850 parts of PET scrap pellets of particle weight about 0.5 g were added to the molten BHT through a scrap supply pipe having a sealing equipment using nitrogen gas at its lower part for preventing the vapor moisturing the pipe. At the same time 292 parts of EG were added continuously for 40 minutes, the moisture in the scrap was distilled off outside the reaction system by using the rectifier equipment and depolymerization was completed in 65 minutes while EG is refluxed. Until its completion, the reaction system and the equivalent ratio of EG to terephthalic acid were kept at 230° C. and 1.5 respectively. Next 2,142 parts, a half of the quantity, of the obtained product were filtrated by using a pleat type highly-accurate filter having an opening diameter of 55 μm and transferred to a polymerizing reactor. Then 0.37 part of phosphoric acid and 0.555 parts of antimony trioxide were added. The temperature and the pressure in the polymerizing reactor were increased to 290° C. and 0.05 mmHg respectively in 60 minutes, and polymerization was continued for 120 minutes, so a polyester having an intrinsic viscosity of 0.650 (in orthochlorophenol at 25° C.), softening point of 256° C. and a color (b-value) of 4.6 was obtained.

EXAMPLE 2

Depolymerization was carried out by the same process as Example 1 with the supplying rate of EG being varied and its equivalent ratio to terephthalic acid being changed to 2.5, 2.0, 1.6, 1.3 and 1.15. The times being required therefor and the qualities of the polymers being obtained thereby are shown in Table 1.

TABLE 1

| Exper. No. | Material* (equiv. ratio) | Depolym. time (min.) | Quality of polymer Softening point (°C.) | Color (b-value) |
|---|---|---|---|---|
| 1 | 2.5 | 124 | 247 | 4.2 |
| 2 | 2.0 | 91 | 253 | 4.3 |
| 3 | 1.6 | 75 | 257 | 4.5 |
| 4 | 1.3 | 63 | 258 | 4.8 |
| 5 | 1.15 | 52 | 258 | 5.3 |

*equivalent ratio: EG/terephthalic acid

The polymer having the equivalent ratios in the range of this invention all showed good properties.

EXAMPLE 3

Depolymerization was carried out by the same process as Example 1 with quantity of the BHT in the reaction-system being changed as shown in Table 2 in terms of the acid component ratio by weight to the added scraps. The times required therefor and the qualities of the polymer obtained thereby are also shown in Table 2.

TABLE 2

| Exper. No. | Ratio* by weight | Depolymerization time (min.) | Qual. of polym. Soft. point (°C.) | Color (b-val.) |
|---|---|---|---|---|
| 6 | 1/5 | 130 | 258 | 4.4 |
| 7 | 1/4 | 110 | 258 | 4.4 |
| 8 | 1/3 | 90 | 258 | 4.4 |
| 9 | 1/2 | 80 | 257 | 4.5 |
| 10 | 1/1 | 70 | 257 | 4.5 |
| 11 | 1.5/1 | 60 | 256 | 4.7 |
| 12 | 2/1 | 55 | 254 | 4.8 |
| 13 | 3/1 | 50 | 252 | 4.9 |

*The acid component ratio by weight of BHT to scraps

All of the polymers having the acid component ratio by weight of BHT to scrap in the range of this invention showed good depolymerization properties and qualities.

EXAMPLE 4

Depolymerization was carried out by the same process as Example 1 with changing the depolymerization temperature as shown in Table 3. The time required therefor and the qualities of the polymer obtained thereby are also shown therein.

TABLE 3

| Exper. No. | Depolym. temp. (°C.) | Depolym. time (min.) | Qual. of polym. Soft. point | Color (b-val.) |
|---|---|---|---|---|
| 14 | 260 | 51 | 257 | 5.4 |
| 15 | 250 | 57 | 257 | 4.9 |
| 16 | 240 | 63 | 257 | 4.7 |
| 17 | 230 | 65 | 256 | 4.6 |
| 18 | 220 | 70 | 257 | 4.5 |
| 19 | 215 | 90 | 254 | 4.4 |
| 20 | 210 | not dissolved | — | — |

The polymers obtained when the reaction system was at the temperature in the range of this invention all showed good depolymerization properties and qualities.

EXAMPLE 5

Depolymerization was carried out by the same process as Example 1 with the supplying time of polyester scrap and ethylene glycol being changed as shown in Table 4. The time required therefor and the qualities of the polymer being obtained thereby are also shown in Table 4.

TABLE 4

| Exper. No. | Scrap supplying time (min.) | Depolym. time (min.) | Qual. of polym. Soft. point (°C.) | Color (b-val.) |
|---|---|---|---|---|
| 21 | 30 | 60 | 257 | 4.5 |
| 22 | 40 | 70 | 257 | 4.5 |
| 23 | 60 | 90 | 255 | 4.7 |

EXAMPLE 6

Depolymerization was carried out by the same process as Example 1 with the size of scrap being changed as shown in Table 5. The time required therefor and the qualities of the polymer obtained thereby are also shown therein.

TABLE 5

| Exper. No. | Size of scrap (g/pc.) | Depolym. time (min.) | Qual. of polym. Soft. point (°C.) | Color (b-val.) |
|---|---|---|---|---|
| 24 | 1.0 | 85 | 257 | 4.8 |
| 25 | 0.5 | 65 | 257 | 4.7 |
| 26 | 0.3 | 60 | 257 | 4.7 |
| 27 | 0.04 | 55 | 258 | 4.6 |

We claim:

1. A process for depolymerizing polyester scrap whose main component is ethylene terephthalate, comprising the steps of
   (1) supplying both ethylene glycol and polyester scrap either in intermittent batches over a period of time, or continuously over a period of time to a reactor in the presence of molten bis hydroxyethyl-terephthalic acid and/or its oligomer (both referred to as BHT) under the following conditions:
      (a) the molten BHT has a glycol to acid component equivalent ratio of 1.3 to 2.0
      (b) the ratio by weight of the acid component of the molten BHT to that of the polyester scrap is 1/4 to 2/1
      (c) the ratio of polyester scrap to ethylene glycol is such as to have a glycol to acid component equivalent ratio between the limits of 1.3 to 2.0
   (2) depolymerizing under agitation between the temperatures of 215° and 250° C.

2. A process for depolymerizing polyester scrap as claimed in claim 1, using scrap particles of about 1 g weight or less.

3. A process for depolymerizing polyester scrap as claimed in Claim 1, using a nitrogen-sealed scrap supplier.

4. A process for depolymerizing polyester scrap as claimed in claim 1, wherein moisture is distilled off outside of the reaction system during depolymerization.

5. A process for obtaining reconstituted polyester from polyester scrap whose main component is ethylene terephthalate, comprising the steps of
   (1) supplying both ethylene glycol and polyester scrap either in intermittent batches over a period of time, or continuously over a period of time to a reactor in the presence of molten bis-hydroxyethyl-terephthalic acid and/or its oligomer (both referred to as BHT) under the following conditions:
      (a) the molten BHT has a glycol to acid component equivalent ratio of 1.3 to 2.0
      (b) the ratio by weight of the acid component of the molten BHT to that of the polyester scrap is to be 1/4 to 2/1
      (c) the ratio of polyester scrap to ethylene glycol is such as to have a glycol to acid component equivalent ratio between the limits of 1.3 to 2.0
   (2) depolymerizing under agitation between the temperatures of 215° and 250° C., and
   (3) removing part of the depolymerized product to a polymerizing reactor, the remainder being left in the depolymerizing reactor for a subsequent polyester scrap depolymerization process.

* * * * *